(12) United States Patent
Eidson

(10) Patent No.: US 6,205,362 B1
(45) Date of Patent: *Mar. 20, 2001

(54) CONSTRUCTING APPLICATIONS IN DISTRIBUTED CONTROL SYSTEMS USING COMPONENTS HAVING BUILT-IN BEHAVIORS

(75) Inventor: John C. Eidson, Palo Alto, CA (US)

(73) Assignee: Agilent Technologies, Inc., Palo Alto, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/976,795

(22) Filed: Nov. 24, 1997

(51) Int. Cl.[7] ................................................ G05B 19/18
(52) U.S. Cl. ............................ 700/4; 700/9; 700/11; 700/52; 700/87; 700/159; 706/45; 717/1; 375/130; 375/222
(58) Field of Search ................................. 706/14, 25, 28, 706/20, 27, 22, 908, 909, 45; 382/157; 700/4, 213, 9, 11, 2, 52, 87, 88, 1, 159; 712/1; 375/130, 222

(56) References Cited

U.S. PATENT DOCUMENTS

| | | | | |
|---|---|---|---|---|
| 5,003,490 | * | 3/1991 | Castelaz et al. | 706/22 |
| 5,048,100 | * | 9/1991 | Kuperstein | 382/157 |
| 5,493,688 | * | 2/1996 | Wringard | 382/157 |
| 5,577,167 | * | 11/1996 | Brown | 706/14 |
| 5,579,440 | * | 11/1996 | Brown | 706/14 |
| 5,598,510 | * | 1/1997 | Castelaz | 706/25 |
| 5,737,626 | * | 4/1998 | Hall et al. | 712/1 |
| 5,769,527 | * | 6/1998 | Taylor et al. | 362/85 |
| 5,805,442 | * | 9/1998 | Crater et al. | 700/9 |
| 5,937,202 | * | 8/1999 | Crosetto | 712/19 |

OTHER PUBLICATIONS

Grant, C.R., Communication networks in transportation Communication Networks in Transportation, IEE Colloquium on, pp.: 4/1–4/6, 1996.*

Puusaari, P., Application oriented analysis of distributed machine control systems Innovations in Manufacturing Control Through Mechatronics, IEE Colloquium on, pp.:8/11–8/13, 1995.*

Pritty et al., A real–time upgrade for Ethernet based factory networking Industrial Electronics, Control, and Instrumentation, Proceedings of the 1995 IEEE IECON 21st International Conference on vol.: 2, pp.: 1631–1637 vol. 2, 1995.*

Lin et al., "Design and Analysis of Fourth–Order Leapforg Topologies for Sigma–Delta A/D Converters", IEEE. pp. 484–489, 1994.*

Groschwitz, et al., "An expert System on Transformer Design for Switched Mode Power Supplies", IEEE. pp. 1413–1418, Feb. 1994.*

Bajaj et al., "Fast Isocontouring for Improved Interactivity", IEEE. pp. 39–46, 1996.*

Chang et al., "POP: An Efficient Performance OPtimization Algorithm Based on Integrated Approach", IEEE. pp. 253–256, 1994.*

Young et al., "automatic Layout Generation for CMS Operational Amplifiers", IEEE. pp. 548–551, 1998.*

* cited by examiner

Primary Examiner—William Grant
Assistant Examiner—McDieunel Marc

(57) ABSTRACT

A distributed control system including self-organizing components which are preselected on the basis of built in behaviors which are needed to perform a particular application. The built in behaviors enable the components to automatically self-organize and perform the application once coupled to the network.

35 Claims, 2 Drawing Sheets

CONSTRUCTING APPLICATIONS IN DISTRIBUTED CONTROL SYSTEMS USING COMPONENTS HAVING BUILT-IN BEHAVIORS

BACKGROUND OF THE INVENTION

1. Field of Invention

The present invention pertains to the field of distributed systems. More particularly, this invention relates to self-organizing distributed systems.

2. Art Background

Control systems commonly include sensors and actuators and application controllers which are arranged to provide control of industrial and other applications. Such sensors may include temperature sensors, pressure sensors, tachometers, etc. Such actuators may include, valves, motors, heaters etc. Application controllers in such a control system may be implemented with programmable logic controllers (PLCs) or computer systems.

The sensors, actuators, and application controllers of a control system may be interconnected via a communication network. Such a communication network may be implemented with a packet-based communication network such as Ethernet or one or more of a variety of a field-level control buses which are specialized for the process control environment. A control system in which elements are interconnected via communication networks may be referred to as a distributed system or a distributed measurement and control system. The sensors and actuators and controllers are usually connected as nodes on the communication network. A node that includes one or more sensors or actuators or controllers may be referred to as a component node or as a component of the distributed control system.

Each component in a distributed system usually interacts with one or more of the other components via the communication network. For example, a particular component may gather data and transfer the data to selected other components. In addition, a particular component may perform computations and provide the results of computation to selected other components. As a consequence, each of the components is usually configured with the appropriate parameters that will enable it to communication with the appropriate ones of the other components in accordance with the overall design of an application.

Prior distributed systems usually undergo a commissioning process during which time each of the components are configured with appropriate parameters. During a typical commissioning process, a system installer manually enters the parameters into each individual component. Unfortunately, such manual entry operations are usually time consuming and expensive and greatly increases the cost of installing prior distributed control systems. Morever, such manual configuration is usually required when new components are added to the system, thereby adding to the cost of upgrading and maintaining existing systems.

In addition, such a commissioning process typically requires that large volumes of information regarding the communication properties and interaction protocols of the components be compiled and provided to the system installer so that the parameters for the individual components may be set properly. Unfortunately, the efforts required to compile installation information adds significantly to the cost of installation and slow the development of new systems.

SUMMARY OF THE INVENTION

A distributed control system is disclosed which includes self-organizing components. The self-organizing components are preselected on the basis of built in behaviors which are needed to perform a particular application. The built in behaviors enable the components to automatically self-organize using a variety of methods and perform the application once coupled to the network. The built-in behaviors enable the particular application to be largely constructed through the process of component selection.

The built-in behaviors may be embodied in the coding of node applications in the components. Each built-in behavior may include a predetermined set of default parameters. The default parameters for a component may be modified using configuration messages generated by other elements of the control system such as parent or peer nodes or control nodes.

Other features and advantages of the present invention will be apparent from the detailed description that follows.

BRIEF DESCRIPTION OF THE DRAWINGS

The present invention is described with respect to particular exemplary embodiments thereof and reference is accordingly made to the drawings in which.

DETAILED DESCRIPTION

Figure 1:
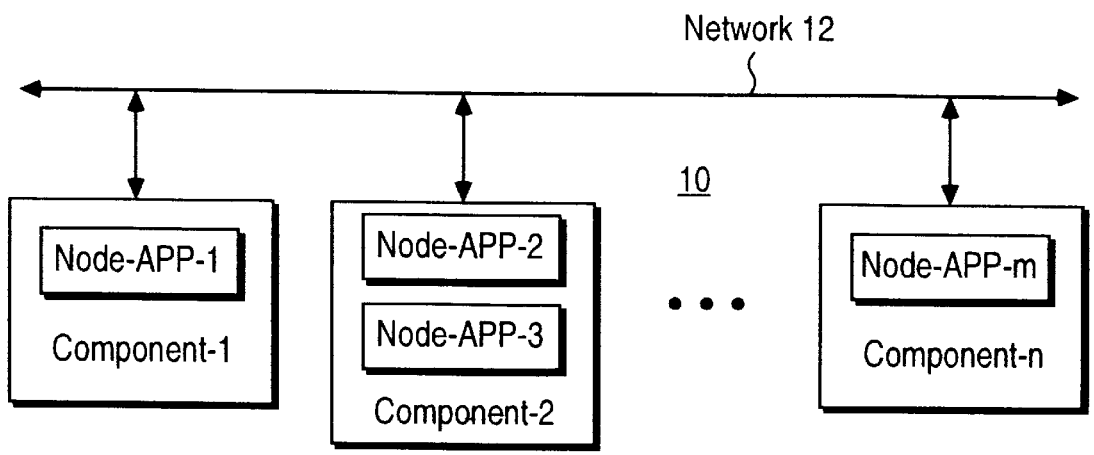
FIG. 1 shows a distributed control system which includes a set of self-organizing components 1-$n$ that interact via a network.

FIG. 1 shows a distributed control system 10 which includes a set of self-organizing components 1-$n$ coupled to a network 12. Each of the components 1-$n$ includes one or more built in behaviors. A designer of an application for the distributed control system 10 selects the components 1-$n$ based upon the built in behaviors needed to perform a particular application. Each of the components 1-$n$ includes software execution resources including a processor and memory for storing code. Each of the components 1-$n$ also includes hardware and software mechanisms for communication via a network 12.

Any one or more of the components 1-$n$ may have one or more attached devices such as sensors or actuators. The components 1-$n$ having a sensor attached are referred to as sensor components. The components 1-$n$ having an actuator attached are referred to as actuator components. The components 1-$n$ which perform control functions are referred to as control components.

The components 1-$n$ execute corresponding node application programs (node-apps) 1-$m$ which are implementations of the built in behaviors. Any one or more of the node-apps 1-$m$ may perform a control behavior or a built in sensor behavior, or a built in actuator behavior. Any one of the node-apps 1-$m$ may represent a singular computational task. In addition, any two or more of the node-apps 1-$m$ may, taken together, provide an aggregate computational task. Such an aggregation of two or more of the node-apps 1-$m$ may be referred to as a virtual node-app. Such virtual node apps may extend across several of the components 1-$n$. For example, the node apps 1–3 may provide a virtual node application.

In addition, node-apps for control behaviors may be embedded in dedicated control nodes on the network 12 such as programmable logic controllers or computer systems with appropriate communication resources.

The network 12 may provide communication to gateways or routers connecting several networks. Such a connection of multiple networks may be arranged in a hierarchical fashion. Networks at higher or lower levels of the hierarchy may include arrangements similar to that of the components 1-$n$.

The built in behaviors of the components 1-$n$ are embodied in the coding of the corresponding node-apps 1-$m$. The built in behaviors enable applications for the distributed control system 10 to a large extent to be constructed by appropriate selection of the components 1-$n$ from among available components. As each component 1-$n$ is connected to the network 12 it automatically organizes itself in accordance with its built in behaviors to meet a specific application objective.

The built in behaviors of the components 1-$n$ include individual behaviors. Examples of built in individual behaviors include the sampling behavior of the sensor components, the alarm generation behaviors of components that perform monitoring functions such as sensor components, and the data handling behavior of data producing components such as sensor components and control components. Other examples of individual behaviors include the normal mode and safe mode behavior of actuator components.

The built in behaviors of the components 1-$n$ include collective behaviors. One example of a collective behavior is the response of the components 1-$n$ to standardized events in the distributed control system 10. The standardized events in the distributed control system 10 may include a reboot event, a system shutdown event, and an emergency event. Another example of a predefined collective behavior is the support for the automatic synchronization of clocks which may be contained in the components 1-$n$.

Each built in behavior of the components 1-$n$ includes default parameters associated with the behavior. The default parameters may be modified based upon a class or grouping of the components 1-$n$. Such a grouping of the components 1-$n$ may be based upon the communication available among the components 1-$n$ via the network 12. Such a grouping of the components 1-$n$ may also be based upon the types of sensors or actuators to which the components are attached or on physical locations of the components 1-$n$, or on a variety of other criteria.

An example of a built in behavior associated with a sensor component is its sampling behavior. An example of a built in sampling behavior is a behavior for performing periodic sampling of an attached sensor. The periodic sampling behavior includes a default sampling rate which may be modified. A designer of an application for the control system 10 that requires a periodic sampling behavior selects one or more of the components 1-$n$ having this built in behavior as required for the particular application. The components 1-$n$ having the built in periodic sampling behavior automatically set up a default sampling rate parameter once connected to the network 12.

The node-apps 1-$m$ of the components 1-$n$ that are coded with the periodic sampling behavior may be coded with a default sampling rate for each type of sensor to which it may be attached. Examples of types of sensors include temperature sensors, chemical element or substance sensors, and pressure sensors to name only a few examples. Once installed in the control system 10, each component 1-$n$ having the built in periodic sampling behavior determines the type or types of attached sensors and then sets its sampling rates to the defaults for the detected types of sensors.

The sampling rate parameters for individual ones or collections of the components 1-$n$ having the built in periodic sampling behavior may be modified using configuration messages transferred via the network 12. The targeted components 1-$n$ receive these configuration messages via the network 12 and set their sampling rate parameters accordingly. These configuration messages may be generated by a parent node, for example an application controller on the network 12, of the targeted components 1-$n$. Alternatively, these configuration messages may be generated by a peer node on the network 12 of the targeted components 1-$n$. These configuration messages may target individual ones of the components 1-$n$ or groups or classes of the components 1-$n$.

In another example of a built in behavior, one or more of the components 1-$n$ may have a behavior built into its corresponding node-app 1-$m$ which causes it to generate an alarm whenever it computes a value indicating an alarm condition. The components 1-$n$ having this alarm behavior automatically determine a default value with which to trigger the alarm once connected to the network 12. The default values which trigger an alarm in individual ones or collections of the components 1-$n$ having this behavior may be set or modified using configuration messages transferred via the network 12. The targeted components 1-$n$ receive these messages via the network 12 and set their alarm triggering values accordingly.

Another example of a built in behavior associated with a component is its data handling behavior. For example, one or more of the components 1-$n$ may have be selected for a particular application on the basis of a data handling behavior built into its corresponding node-app 1-$m$ which causes it to internally log data samples obtained from an attached sensor. In another example, one or more of the components 1-$n$ may be selected for a data handling behavior built into its corresponding node-app 1-$m$ which causes it to automatically post data samples it obtains from an attached sensor to a destination or to a set of destinations on the network 12. A designer for an application of the control system 10 selects the components 1-$n$ having either the internal logging or external posting behavior where appropriate and the selected components 1-$n$ automatically behave accordingly once they are connected to the network 12.

An example of a predetermined behavior associated with an actuator component is a built in control loop behavior. For example, one or more of the components 1-$n$ may be selected for a control loop behavior built into its corresponding node-app 1-$m$ which causes it to drive an attached actuator using control values which are posted on the network 12. This control loop behavior may include a built in safe mode so that an actuator component puts its attached actuator into a predetermined safe mode if communication is lost with other components on the network 12 that are required for the control loop.

For example, an actuator component for controlling an attached heater may have a built in behavior for driving the heater to maintain a desired temperature in response to heater control values posted on the network 12. This behavior may include a default behavior for switching off the attached heater if communication is lost with other elements of the heater control loop. A designer for an application of the control system 10 selects the components 1-$n$ having these built in behaviors where appropriate and the selected components 1-$n$ automatically behave accordingly once they are connected to the network 12.

The default parameters for the built in behaviors of the components 1-$n$ may be based upon the particular devices to which the components 1-$n$ are attached. Alternatively, the default parameters may be based upon a collective or group attribute such as class membership. The components 1-n may determine their class membership once connected to the network 12 and then modify their default parameters in response to the class membership. Alternatively, configuration messages may be transferred via the network 12 to change of the sampling rate parameter of all members of a class of the components 1-n.

The node-apps 1-m in the components 1-n include code for supporting predefined procedures which operate in a distributed manner across an arbitrary collection of the components 1-n. The predefined procedures support common application tasks such as aggregation, ordering, value selection, class membership determination, and voting, etc. The predefined procedures in the components 1-n may be varied by modifying the parameters associated with the predefined procedures using, for example, configuration messages transferred via the network 12 to individual ones or classes of the components 1-n. Alternatively, the predefined procedures may be varied by coding functional alternatives for each predefined procedure in the node-apps 1-m.

Each of the components 1-n supports a locally maintained state. The locally maintained state can be modified in response to a variety of conditions. For example, the locally maintained states of the components 1-n may change in response to the collective procedures, in response to local behavioral events, in response to results of local computation or local transducer action, in response to the receipt of events or data via the network 12, or system defined events or conditions, etc. Each of the components 1-n also supports system wide predefined states including initialization, running, and termination. These system wide states may be sub-stated or be empty as long as the components 1-n respond to the states in the appropriate manner.

The node-apps 1-m may support one or more of a variety of relationship constructs depending on the particular built in behavior. These relationship constructs may used to define the coverage of configuration messages transferred via the network 12 and the application of procedures to individual or groups of the components 1-n. These relationships include hierarchical constructs of peers, parents, and children. These relationships also include nearest neighbors and proximity. These constructs are standardized both semantically and in terms of name-space across the system.

For example, the components 1-n having a built in behavior for periodically sampling an attached sensor may obtain their sampling rate parameters from their parent node on the network 12. The components 1-n determine their parent nodes on the network 12, for example one of the other components 1-n or an application controller, and then obtain sampling rates from their parent nodes which their parent nodes provide in configuration messages posted on the network 12. Similarly, the components 1-n having a built in data handling behavior of periodically posting data to the network 12 may periodically post the data to their peers on the network 12 or to their parents on the network 12.

The components 1-n post data and report events and transfer configuration messages in accordance with a standardized self describing and uniform data model for communication on the network 12. In one embodiment, message packets and data packets transferred via the network 12 according to a publish-subscribe protocol. This publish-subscribe protocol enables components to be automatically set up into self-organizing applications in the distributed control system 10.

Figure 2:
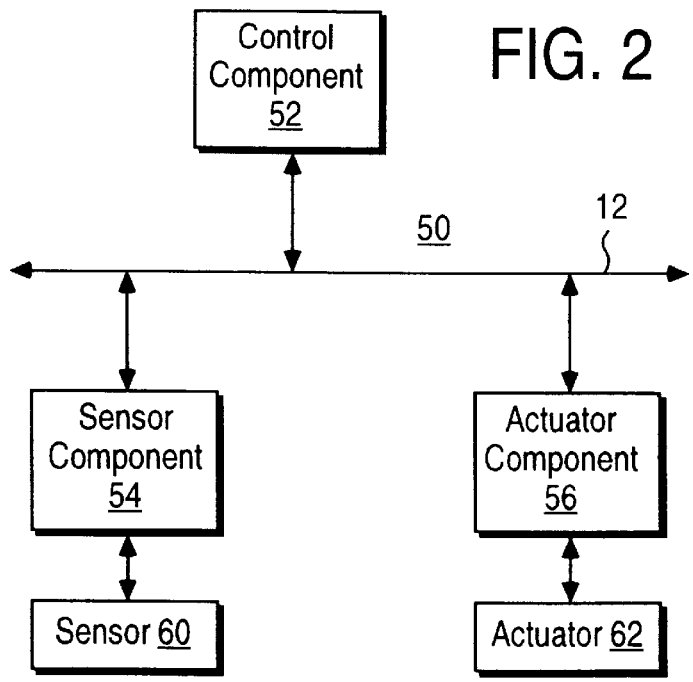
FIG. 2 shows a set of self-organizing components arranged into a control loop.

FIG. 2 shows a set of self-organizing components 52–56 arranged into a control loop 50 on the network 12. The components for the control loop 50 include a control component 52, a sensor component 54, and an actuator component 56. The sensor component 54 has an attached sensor 60 and the actuator component 56 has an attached actuator 62 for use with the control loop 50. The control component 52 has a built in control node-app, the sensor component 54 has a built in sensor node-app, and the actuator component 56 has a built in actuator node-app.

The control component 52 is preselected for the control behavior provided by its built in control node-app. One example of a control behavior for a control loop is a proportional-integral-derivative (PID) algorithm. The built in control behavior causes the control component 52 to obtain data samples posted on the network 12, generate control values in response to the data samples, an then post the control values on the network 12. The control component 52 starts listening for posted sensor data samples for use with its built in control behavior once connected to the network 12.

The sensor component 54 is preselected for the behavior of its built sensor node-app in which it periodically samples the attached sensor 60. The sensor component 54 automatically engages in the built in sampling behavior once connected to the network 12. The sensor component 52 initially samples the sensor 60 at its default sampling rate. The sampling rate may be modified by a configuration message transferred via the network 12, for example, from the control component 52. In accordance with its built in data handling behavior, the sensor component 54 periodically posts or publishes obtained sensor data samples on the network 12 for use, for example, by the control component 52.

The actuator component 56 is preselected for the built in behavior of its actuator node-app for obtaining control values via the network 12 and applying the control values to the actuator 62. The actuator component 56 automatically listens for control values posted on the network 12 once it is connected to the network 12.

The interaction of the components 52–56 as described above is an example of a grouping based upon communication in that the components 52–56 automatically interact with one another based upon their ability to communication with one another via the network 12. The control component 52 consumes data samples posted by the sensor component 54 and the actuator component 56 consumes control values posted by the control component 52. This grouping may be accomplished, for example, by placing the components 52–56 on a sub-net of the network 12. If the components 52–56 are able to communicate with other components on the network 12 then other types of groupings may be used to automatically organize the control loop 50.

For example, the components 52–56 may be grouped on the basis of physical proximity. If the actuator component 56 detects control values posted on the network 12 that originate with differing control components then the actuator component 56 uses the control values that originate with the closest of the control components. The messages used by control components to post control values may include the physical coordinates of the originating control component. This enables the actuator component 56 to be installed anywhere in the distributed control system 10 and automatically determine a control component from which to obtain control values. Similarly, if the control component 52 detects data samples posted by differing sensor components then it consumes the data samples from the closest of the sensor components.

In another example, the components 52–56 may be grouped on the basis of units. If the actuator component 56 detects control values posted on the network 12 that originate with differing control components then the actuator component 56 uses the control values that match the units required for its attached actuator 62. For example, if the actuator 62 is a heater then the actuator component 56 consumes control values having temperature units. The messages used by control components to post control values include units for the corresponding control values. Similarly, if the control component 52 is controlling temperature then it consumes only the temperature data samples posted on the network 12.

In an alternative embodiment of the control loop 50, the control node-app may be included in either the sensor component 54 or the actuator component 56. The control node-app consumes posted data samples and posts control values either locally or via the network 12 depending on the selection of the components 54 and 56.

For example, in one embodiment, the sensor component 54 includes the control node-app and the sensor node-app. The sensor node-app posts sensor data samples to the control node-app locally in the sensor component 54. In response, the control node-app generates control values and posts the control values on the network 12. The actuator component 54 consumes the control values posted on the network 12 and applies them to the actuator 62.

In another embodiment, the actuator component 54 includes the control node-app and the actuator node-app. The sensor node-app posts sensor data samples on the network 12 and the control node-app in the actuator component 54 consumes the sensor data samples posted on the network 12. The control node-app in the actuator component 54 generates control values and posts the control values locally to the actuator node-app in the actuator component 54 which applies the control values to the actuator 62.

In some embodiments, the built in behaviors, procedures, support for locally maintained states and relationships are a permanent fixture of all of the components 1-n and are embodied in the coding of the corresponding node-apps 1-m. Alternatively, the built in behaviors, procedures, support for locally maintained states and relationships may be a fixture of components applicable in certain application domains. The choice of embodiment depends on the economics and the range of applicability desired.

The built in behaviors, procedures, support for locally maintained states and relationships supported by the components 1-n enable the following method for constructing applications in the distributed control system 10. Initially, the components 1-n are selected from among the available components based upon the needs of the particular application being constructed. One or more of the components 1-n may be selected, for example, based upon the type of devices which may be attached. As another example, one or more of the components 1-n may be selected based upon built in individual behaviors or collective behaviors that are useful for the application being constructed. An application being constructed is designed so that the maximum amount of functionality is met by the use of collective behaviors of the selected components 1-n.

Next, the state behavior of all the selected components 1-n is defined. It is preferable that the application be designed in such a way that the state behavior of the selected components 1-n can be applicable to classes of the components 1-n rather than to the individual components 1-n.

The communication topology of the distributed control system 10 is then designed making full use of installation alternatives which can automatically implement the bindings required by the application being constructed. For example, groups of components may be sub-netted on the network 12. As another example, a communication protocol such as the user datagram protocol (UDP) may be employed with default addresses for the selected components 1-n. This protocol enables the selected components 1-n to perform self-configuration once connected to the network 12 using a publish-subscribe method of interaction.

The parameters of the collective and individual behaviors and procedures of the selected components 1-n are activated or modified using configuration messages transferred via the network 12. These built in behaviors and procedures may be customized if necessary. It is preferable that the application be designed in such a way that modification to parameters is performed by reference to classes of the components 1-n rather than on the basis of the individual components 1-n.

Finally, any application requirements which can not be satisfied using the built in behaviors and procedures are modifications thereof are customized into the particular components 1-n. For example, customized code may be added to the appropriate ones of the node-apps 1-m.

The method set forth above allows an application designer to construct new applications from the predefined capabilities supported in the components 1-n. The new applications can operate based on the inherent capability of individual or collections of the components 1-n and on modifications of these inherent capabilities.

The predefined capabilities, including built in behaviors and procedures, of the components 1-n may be based upon groupings. Such a grouping may be accomplished by a class membership definition. One example of a class membership definition is all of the components 1-n which measure temperature. Another example of a class is all the components 1-n located in the vicinity of a coordinate point x, y, z.

As an example of a collective behavior based on grouping, an application may specify that an aggregation of data samples in the form of a mean be reported by all components 1-n which belong to a group defined as the components 1-n that measure temperature. The supported relationships of peers and nearest neighbors are useful in forming collections of grouped components and forming the communication paths among the collections of grouped components.

The types of groupings or class membership definitions employed by an application can include a wide variety of semantics. Examples of membership criteria and example application domains in which each may be useful are given below.

Groupings of the components 1-n may be based on their physical locations. The physical locations of the components 1-n may be represented as coordinates, for example latitude, longitude, elevation or other grid representations.

Groupings of the components 1-n may be based on their physical locations in terms of a containment hierarchy. An example is a building control application for the distributed control system 10 in which a location hierarchy including a building number, a floor number, a room number, room coordinates x, y, z or room contents enumeration are used.

Groupings of components 1-n may be based on their physical locations in terms of an enumeration-human readable pair. An example of this is a building control application for the distributed control system 10 where the enumeration designates specific locations.

Groupings of the components 1-n may be based on their physical locations in terms of proximity. An example is a grouping which includes all the components 1-*n* located within 10 meters of the coordinates x, y, z.

Groupings of the components 1-*n* may be based on their physical locations in terms of nearest neighbor identification. These types of groupings are useful in fault detection applications of the distributed control system 10 such as with power lines or other linear processes.

Groupings of the components 1-*n* may be based on function. An example of a grouping based on function is all of the components 1-*n* that measure temperature. Another example is all of the components 1-*n* that are performing an aggregation over temperature as may be useful in a process monitoring or control application for the distributed control system 10.

Groupings of the components 1-*n* may be based on their communication properties. An example of such a grouping is as all of the components 1-*n* which receive a particular message. Such a grouping may be useful in a telecommunication diagnosis application for the distributed control system 10.

Groupings of the components 1-*n* may be based on a particular value. For example, such a grouping may include the components 1-*n* that measure temperatures below freezing. Another example is the components 1-*n* that have detected two events of some class within a specified time interval. Such groupings may be useful in alarm system applications for the distributed control system 10.

The groupings of the components 1-*n* need not be static. The membership properties of the components 1-*n* may be re-evaluated periodically or on some state change or event. In addition, the built in procedures in the components 1-*n*, including procedures such as aggregation or ordering, should preferably execute periodically or on some state change or similar event. In this way dynamic application behavior can be constructed.

Figure 3:
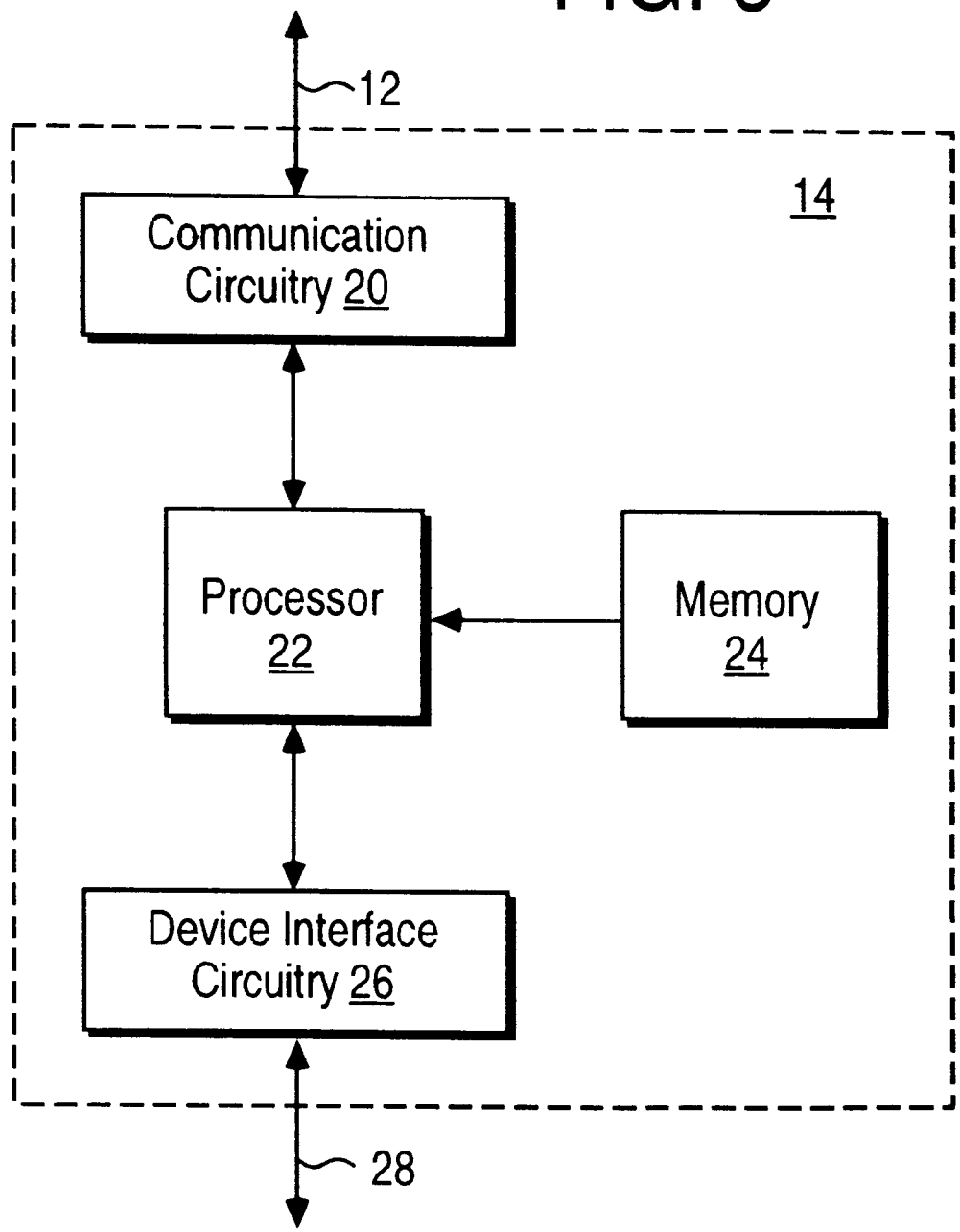
FIG. 3 illustrates elements of an example self-organizing component.

FIG. 3 illustrates an example component 14 of the components 1-*n*. The component 14 includes a set of communication circuitry 20 which enables communication via the network 12. The communication circuitry 20 and associated code enables the reception of configuration messages that set parameters in the component 14 that vary default behaviors built in to the component 14. The communication circuitry 20 also enables reception and posting of data on the network 12.

The component 14 includes a processor 22 and a memory 24 that enable storage and execution of one or more node-apps which provide its built in behaviors and support the collective procedures in the distributed control system 10. The memory 24 also enables logging of data samples obtained from an attached sensor if such behavior is implemented in a corresponding node-app.

The component 14 includes a set of device interface circuitry 26 wich interfaces to an attached device via a communication path 28. The attached device may be a sensor or an actuator or combination. The device interface circuitry 26 enables the processor 22 to determine the type of devices attached. This enables a node-app in the component 14 to set up default parameters and to determine whether it is a member of a class based upon type of device attached.

Consider a first example application for the distributed control system 10 in which temperatures must be monitored every ten minutes in a monitored area of the distributed control system 10. Assume also that a hydrocarbon concentration must be monitored every second but only reported every ten minutes in the monitored area. Assume further that if the hydrocarbon concentration at any location in the distributed control system 10 exceeds a specified threshold, then all components within fifty meters of the detection point must report their per second readings obtained for the preceding minute and for the minute following the time of detection. Further, assume that the number and locations of the components 1-*n* can vary as components are removed for servicing, but the distributed control system 10 may not be brought down for this purpose. Finally, assume that all data is to be recorded in a database.

The following is an outline of a design solution for the first application in the distributed control system 10 in which a substantial amount of the application functionality is accomplished with appropriate selection of the components 1-*n*. Initially, a first group of the components 1-*n* are selected having built in behaviors for measuring temperature and broadcasting temperature measurements periodically. The sample rate for the first group is determined by a configuration message which is sent periodically via the network 12 to the first group as a class of the components 1-*n* that measure temperature.

Next, a second group of the components 1-*n* are selected for having built in behaviors for periodically measuring hydrocarbon concentration and communicating their hydrocarbon concentration measurements into a peer group. The sample rate for the second group is determined by a configuration message which is sent periodically to the second group as a class of the components 1-*n* that measure hydrocarbon concentration. The members of the second group of the components 1-*n* are also selected for a behavior in which they log and time-stamp their obtained measurements in an internal buffer.

The members of the second group of components 1-*n* are configured or customized to detect whether any of their measurements exceed a specified threshold. If one of the members of the second group renders a measurement that exceeds the specified threshold then it signals an event on the network 12. The event includes a time-stamp and the coordinates of the component 1-*n* signaling the event.

The members of the second group of the components 1-*n* are also configured or customized to broadcast data from their internal log for times preceding the event time-stamp by one minute and for an additional minute thereafter when such an event is either detected by them or received from another one of their group within 50 meters.

The members of the second group of the components 1-*n* broadcast data and events via the network 12 using self describing packets which include time-stamps, location of the originating component, and units for the data. This behavior is built into each component 1-*n* of the second group. The periods for broadcast and the specified thresholds, etc. are provided to the members of the second group using configuration messages which are periodically transferred to the second group as a class via the network 12.

Next, a database for the first application in the distributed control system 10 is selected. The database is configured or customized to automatically store any data received via the network 12 in units appropriate to temperature and hydrocarbon concentration.

Next, a node on the network 12 is constructed, such as an application controller, which periodically sends the appropriate configuration messages to the components 1-*n*. There are two such configuration messages. One message which is acted upon by the first group of components which measure temperature, the other by the second group which measure hydrocarbon concentration. It is these configuration messages which allow a component of either the first or second group to be introduced into the distributed control system 10 and learn the current application parameters on a dynamic basis.

It should be noted that identical code runs in the node-apps of all members of the first group of the components 1-$n$ that measure temperature, and identical code runs in the node apps of all of the second group which measure hydrocarbon. Further, there are no name-space issues since all communication is based either on functional membership, that is temperature or hydrocarbon measuring devices, or on spatial membership.

Consider a second example of application construction, in which a process line is to contain a number of the components 1-$n$ which perform identical functions. The number n on the process line at any moment can vary. Assume that items to be processed must be processed by the component 1-$n$ which has been on-line and in idle state the longest. Each components 1-$n$ for this application includes an internal synchronized clock. Each component 1-$n$ samples and stores the local time when it either comes on line or when it completes processing an item.

All of the components 1-$n$ participate in a protocol for determining the oldest stored local time which is independent of the number of components participating. This protocol which is distributed across and built in to the components 1-$n$ enables each component to determine whether it is next in line. When an item is to be processed it is accepted by the component 1-$n$ which has the oldest stored local time.

An outline of such a minimization protocol is as follows. All components 1-$n$ listen for a clock value published on the network 12 within a defined period. The components 1-$n$ that detect a clock value published on the network 12 that is less than their internal clock value remain silent. The components 1-$n$ that detect a clock value that is greater than their internal clock value publish their internal clock value on the network 12. The components 1-$n$ that detect a clock value on the network 12 that is less than their internal clock value publish their internal clock value if the value detected was theirs also. The components 1-$n$ that do not detect a clock value on the network 12 for a designated period of time publish their internal clock value on the network 12.

The foregoing detailed description of the present invention is provided for the purposes of illustration and is not intended to be exhaustive or to limit the invention to the precise embodiment disclosed. Accordingly, the scope of the present invention is defined by the appended claims.

What is claimed is:

1. A method for constructing an application in a distributed control system, comprising the steps of:
   providing a set of available components each having at least one built in behavior associated with the distributed control system;
   selecting a set of components for performing the application from among the available components based on the needs of the application;
   design a topology for communication among the components based on one or more groupings of the components for the application; wherein the step of designing a topology for communication among the components comprises the step of designing a topology such that at least one subset of the components are connected to a communication sub-set.

2. The method of claim 1, wherein the step of selecting a set of components comprises the step of selecting at least one of the components based on a built in sampling behavior.

3. The method of claim 1, wherein the step of selecting a set of components comprises the step of selecting at least one of the components based on a built in alarm generation behavior.

4. The method of claim 1, wherein the step of selecting a set of components comprises the step of selecting at least one of the components based on a built in data handling behavior.

5. The method of claim 1, wherein the step of selecting a set of components comprises the step of selecting two or more of the components based on a built in collective behavior.

6. The method of claim 1, wherein the step of selecting a set of components comprises the step of selecting at least one of the components based on a built in control loop behavior.

7. The method of claim 6, wherein the built in control loop behavior includes a built in safe mode behavior.

8. The method of claim 1, wherein the built in behavior of one or more of the components includes a set of default parameters.

9. The method of claim 8, wherein the default parameters are based upon one or more attached devices.

10. The method of claim 8, wherein the default parameters are based upon a class membership.

11. The method of claim 1, wherein the step of designing a topology for communication among the components comprises the step of designing a topology such that at least one subset of the components are connected to a communication sub-net.

12. The method of claim 1, wherein the step of designing a topology for communication among the components comprises the step of designing a communication network in which the components each have a default address.

13. The method of claim 1, further comprising the step of modifying the built in behaviors of the components using one or more messages transferred via the topology for communication.

14. The method of claim 1, wherein the application is a control loop application.

15. The method of claim 1, further comprising the step of modifying the built in behaviors of the components based upon the grouping of the components.

16. The method of claim 1, wherein the grouping of the components is based on the topology for communication.

17. The method of claim 1, wherein the grouping of the components is based on a type of device to which each components is attached.

18. The method of claim 1, wherein the grouping of the components is based on a physical location of each of the components.

19. A method for constructing an application in a distributed control system, comprising the steps of:
   providing a set of available components each having at least one built in behavior associated with the distributed control system;
   selecting a set of components for performing the application from among the available components based on the needs of the application;
   designing a topology for communication among the components based on one or more groupings of the components for the application wherein the step of designing a topology for communication among the components comprises the step of designing a topology such that at least one subset of the components are connected to a communication sub-net.

20. The method of claim 19, wherein the step of selecting a set of components comprises the step of selecting at least one of the components based on a built in sampling behavior.

21. The method of claim 19, wherein the step of selecting a set of components comprises the step of selecting at least one of the components based on a built in alarm generation behavior.

22. The method of claim 19, wherein the step of selecting a set of components comprises the step of selecting at least one of the components based on a built in data handling behavior.

23. The method of claim 19, wherein the step of selecting a set of components comprises the step of selecting two or more of the components based on a built in collective behavior.

24. The method of claim 19, wherein the step of selecting a set of components comprises the step of selecting at least one of the components based on a built in control loop behavior.

25. The method of claim 24, wherein the built in control loop behavior includes a built in safe mode behavior.

26. The method of claim 19, wherein the built in behavior of one or more of the components includes a set of default parameters.

27. The method of claim 26, wherein the default parameters are based upon one or more attached devices.

28. The method of claim 26, wherein the default parameters are based upon a class membership.

29. The method of claim 19, wherein the step of designing a topology for communication among the components comprises the step of designing a communication network in which the components each have a default address.

30. The method of claim 19, further comprising the step of modifying the built in behaviors of the components using one or more messages transferred via the topology for communication.

31. The method of claim 19, wherein the application is a control loop application.

32. The method of claim 19, further comprising the step of modifying the built in behaviors of the components based upon the grouping of the components.

33. The method of claim 19, wherein the grouping of the components is based on the topology for communication.

34. The method of claim 19, wherein the grouping of the components is based on a type of device to which each components is attached.

35. The method of claim 19, wherein the grouping of the components is based on a physical location of each of the components.

* * * * *